Feb. 11, 1930.                G. F. DUGGER                1,747,059
                                CULTIVATOR
                            Filed March 31, 1928
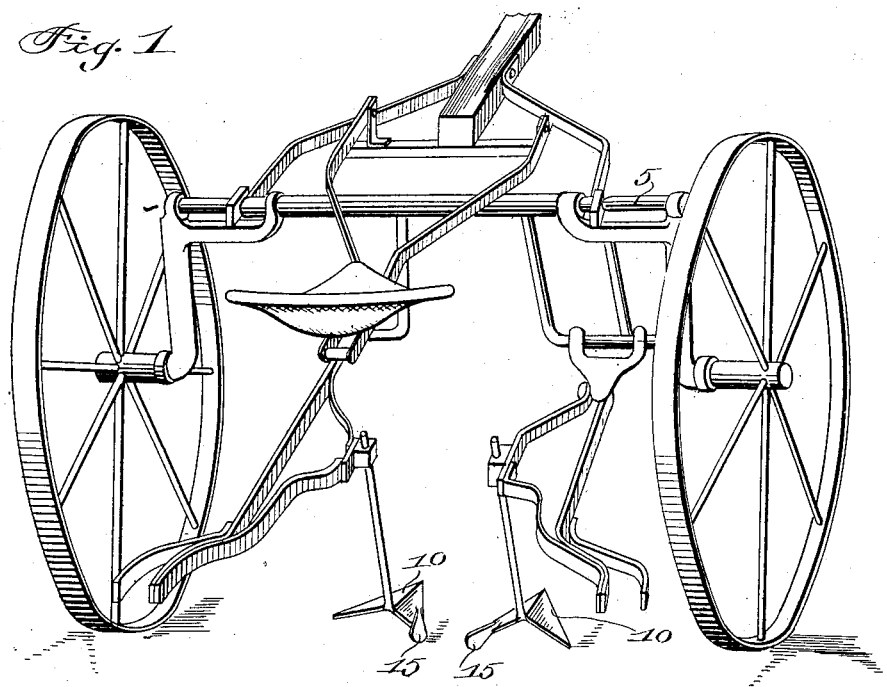
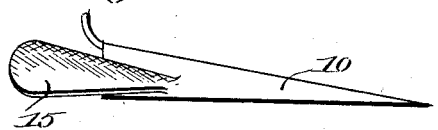
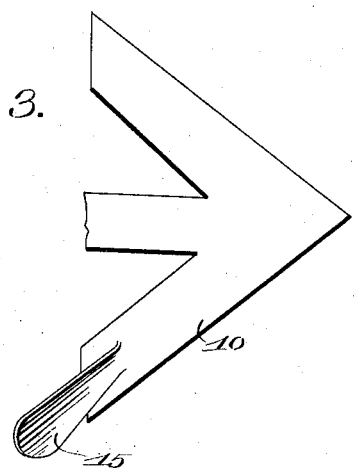
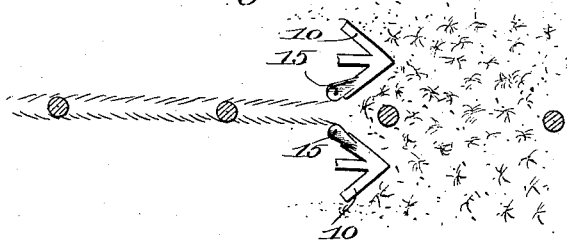
INVENTOR
G. F. DUGGER
BY
ATTORNEY Patented Feb. 11, 1930

1,747,059

UNITED STATES PATENT OFFICE

GEORGE FRANK DUGGER, OF ALLEN, TEXAS, ASSIGNOR OF ONE-HALF TO JAMES GARLAND, OF ALLEN, TEXAS

CULTIVATOR

Application filed March 31, 1928. Serial No. 266,273.

My invention relates to cultivators and an object thereof is to provide a cultivator or earth working blade whereby grass and other vegetation may be uprooted from the ground in closs proximity to the roots of growing plants, while the row is being cultivated.

Further the invention provides an earth working blade having an angularly disposed wing or extension at one side which will reach close to the plants to dislodge vegetation adjacent thereto without danger of cutting or otherwise injuring the plants.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a perspective of a cultivator embodying my invention;

Figure 2 is a side elevation of a cultivator blade constructed in accordance with my invention;

Figure 3 is a top plan view of the same; and

Figure 4 is a top plan view of a pair of the cultivator blades in operative position to cultivate a row of plants.

Referring to the invention in detail a conventional straddle row wheeled cultivator 5, equipped with a pair of transversely alined V-shaped cultivator or earth working blades 10, is provided.

For the purpose of lifting or severing sod or other vegetation growing adjacent the roots of a row of small plants such as cotton, the inner wing of each cultivator blade is formed with a rearwardly projecting spoon 15, the latter gradually increasing in width from its inner end and having its outer end rounded. The spoon is set at a greater inclination than the wing to which it is attached and at its forward end merges into the upper face of such wing. In this instance I have illustrated the spoon as being formed integrally with the cultivator blade, but it will be manifest that it may be riveted or secured in any other desirable manner.

In practice the cultivator is drawn along the row with the cultivator blades upon each side thereof in the usual manner, and as illustrated in Figure 4, the spoons project relatively close to the plants to uproot vegetation that may be growing in their path and adjacent the roots of the plants.

What is claimed is:—

As an article of manufacture, a cultivator blade having a cutting edge arranged at an oblique angle with respect to the line of draft, a relatively flat extension carried by the blade at the rear end of the cutting edge which gradually increases in width from its inner end and having its outer end rounded, the extension being arranged at an oblique angle with respect to the horizontal and the blade and having a substantial portion of its lower edge projecting forwardly beyond the cutting edge so that the soil cut by such edge will be swept toward the plant row and turned by the extension.

Signed at Allen, in the county of Collin and State of Texas this 26th day of March, 1928.

GEORGE FRANK DUGGER.